United States Patent [19]

Ruka et al.

[11] E Re. 28,792

[45] Reissued Apr. 27, 1976

[54] ELECTROCHEMICAL METHOD FOR SEPARATING $O_2$ FROM A GAS; GENERATING ELECTRICITY; MEASURING $O_2$ PARTIAL PRESSURE; AND FUEL CELL

[75] Inventors: Roswell J. Ruka, Pittsburgh, Pa.; Joseph Weissbart, Palo Alto, Calif.

[73] Assignee: Westinghouse Electric Corporation, Pittsburgh, Pa.

[22] Filed: Mar. 22, 1974

[21] Appl. No.: 454,021

Related U.S. Patent Documents

Reissue of:

[64] Patent No.: 3,400,054
Issued: Sept. 3, 1968
Appl. No.: 534,322
Filed: Mar. 15, 1966

U.S. Applications:

[63] Continuation-in-part of Ser. No. 126,098, July 24, 1961, abandoned.

[52] U.S. Cl. ..... 204/1 T; 136/86 F; 204/195 S

[51] Int. Cl.[2] ..... H01M 8/12; C25B 1/02

[58] Field of Search ..... 204/195 S, 129

[56] References Cited

UNITED STATES PATENTS

| | | | |
|---|---|---|---|
| 2,928,783 | 3/1960 | Bacon | 204/256 X |
| 3,110,622 | 11/1963 | Hipp | 136/86 X |
| 3,132,972 | 5/1964 | Ludwig | 204/129 X |
| 3,138,487 | 6/1964 | Tragert | 136/86 X |
| 3,146,131 | 8/1964 | Linden et al | 136/86 |
| 3,347,767 | 10/1967 | Hickam | 204/195 S |
| 3,489,670 | 1/1970 | Maget | 204/129 |

FOREIGN PATENTS OR APPLICATIONS

| | | | |
|---|---|---|---|
| 1,386,878 | 12/1964 | France | 204/129 |
| 1,039,412 | 8/1966 | United Kingdom | 204/129 |

OTHER PUBLICATIONS

H. Steinmetz, "Development of a Continuous Meter for Oxygen in Sodium," United Nuclear Corp., White Plains, N.Y., 8/1962, p. 11.

Kiukkola et al., "Measurements on Galvanic Cells Involving Solid Electrolytes," in J. Elect. Chem. Soc., 6/1957, pp. 379–386.

J. Weissbart et al., "Oxygen Gauge," in the Review of Scientific Instruments, Vol. 32, No. 5, May 1961, pp. 593–595.

Baur et al.: "Uber Brennstoff-Ketten Mit Festleitern," in Zeitschrift Electrochemie Bd. 43, NR. 9, 1937, pp. 728–732.

*Primary Examiner*—Allen B. Curtis
*Attorney, Agent, or Firm*—M. P. Lynch

[57] ABSTRACT

*A fuel cell and method of operation of same is detailed for measuring oxygen pressure, separating oxygen from a gas, or generating electrical energy. The fuel cell has first and second electrodes of selected materials with a solid partition of a solid electrolyte between the electrodes. The solid electrolyte consists of a solid solution of selected oxides having a high degree of oxygen ion conductivity.*

11 Claims, 8 Drawing Figures

ELECTROCHEMICAL METHOD FOR SEPARATING $O_2$ FROM A GAS; GENERATING ELECTRICITY; MEASURING $O_2$ PARTIAL PRESSURE; AND FUEL CELL

Matter enclosed in heavy brackets [ ] appears in the original patent but forms no part of this reissue specification; matter printed in italics indicates the additions made by reissue.

This application is a continuation-in-part of application Ser. No. 126,098, filed July 24, 1961, now abandoned.

This invention relates generally to electrochemical devices, and particularly fuel cells, for conversion between chemical and electrical forms of energy and, more particularly, to those having a solid electrolyte through which oxygen ions are conducted.

The present invention will be discussed principally in connection with fuel cells because it is a typical application of the invention which is of considerable interest. It should be particularly noted, however, that the invention in its broader aspects is applicable to electrochemical devices for other purposes including electrical energy generation as part of a heat engine, the separation of oxygen from a gas mixture such as air and the measurement of oxygen pressure.

In general, a fuel cell is an electrochemical cell to which a fuel and an oxidant are supplied and permitted to react in a manner resulting in the direct production of useful electrical energy. The reactants and the reaction products are supplied and removed continuously. For practical levels of power generation it is, of course, desirable that low cost materials be used such as air for the oxidant and carbonaceous gases or coal for the fuel. Therefore, a fuel cell is limited, not by necessity but as a matter of practice, to those capable of operating on conventional fuels. Conventional fuels are today the fossil fuels, naturally occurring gaseous hydrocarbons and fuels, easily derived from them, such as hydrogen and carbon monoxide.

Fuel cells and batteries are each a class of devices for the conversion of chemical energy to electrical energy. They are distinct, however, as the terms are currently used in the art. A battery is a device which itself stores chemical energy and converts it to electrical energy on demand. A primary battery is one that is used for a single energy discharge only while a secondary battery is one in which the products of the chemical reaction are converted back to the original chemical reactants by electrical charging. On the other hand, a fuel cell is merely an energy converter; it is not a source of stored energy. A fuel cell is operated by having reactants supplied continually to it and ideally its life is not affected by the chemical reaction per se.

Fuel cells are not limited in potential application merely to small power sources but are also of interest for large scale power generation because they are not subject to Carnot cycle limitations and hence offer the possibility of a higher conversion efficiency than such devices as steam turbine generators.

Many investigators believe that cells having molten salt electrolytes and operating at about 500° C. to 800° C. are the most promising for low cost power generation. However, problems have been encountered with devices of this type, such as difficulty in adequately containing the electrolyte, corrosion of the electrodes, gas leakage and the maintenance of the activity of the catalysts at the electrodes to facilitate or speed up the electrochemical reactions taking place there. In addition, the gas pressure at the electrodes must be regulated so that "cell drowning" and "cell gassing" do not occur. In cell drowning, the liquid electrolyte is forced into the electrode pores by capillary action and in cell gassing the gas forces the electrolyte out of the pores. In both cases, the three phase electrode-electrolyte-gas reaction zone necessary for efficient cell operation is destroyed. Such problems have been so serious that only small cells have been built which require an external heat source to maintain them at operating temperature.

Another type of cell is that which utilizes a solid electrolyte and operates at generally higher temperatures. Heretofore, such cells have been characterized by their very low current density resulting from a high internal resistance, corrosion problems and irreversible changes in the electrolyte during operation. This has led to the general feeling that such devices will not reach a practical level of operation.

As a result of our investigations into solid electrolyte fuel cells, it was found that the problems reported by prior investigators are not applicable to all solid electrolytes under all conditions and that certain high temperature devices show promise of practical power generation.

It is, therefore, an object of the present invention to provide an improved electrochemical device having a solid electrolyte and which is suitable for fuel cells and other applications.

Another object is to provide a solid electrolyte fuel cell whose electrolyte and electrodes are quite stable and do not deteriorate in operation.

Another object is to provide a practical fuel cell which avoids problems of electrolyte containment, gas leakage and cell drowning and gassing, and reduces catalysts problems.

Another object is to provide an electrochemical device for power generation which can utilize any heat source.

Another object is to provide an electrochemical device for the separation of oxygen from a gas mixture.

Another object is to provide an electrochemical device for the measurement of oxygen pressure.

In accordance with the most general aspects of the present invention, there is provided an electrochemical cell which has a solid electrolyte consisting essentially of a solid solution of ionically conductive oxides. The electrolyte can be represented by the formula:

$$(MO_2)_{1-x}(R_yO_z)_x$$

where M represents at leasat one tetravalent element from the group consisting of zirconium, thorium, and hafnium, R represents at least one element from the group consisting of elements which form cations with stable +2 and +3 valences in the oxide, x represents a number having a value of from about 0.05 to about 0.3 and y and z represent numbers having values sufficient to make $R_yO_z$ electrically neutral. Examples of elements which are suitable for the element R are calcium, barium, strontium, yttrium, lanthanum, scandium, ytterbium and samarium which form the oxides CaO, BaO, SrO, $Y_2O_3$, $La_2O_3$, $Sc_2O_3$, $Yb_2O_3$ and $Sm_2O_3$, respectively. Porous conductive layers serving as electrodes are disposed on opposite sides of the electrolyte and are selected of material which is stable under the operating conditions of the device.

According to other features of the invention, an electrochemical cell having the general structure just described is provided for operation under various particular operating conditions for various purposes. The devices are operated at temperatures of about 500° C. to about 1200° C.

In one form of the invention, a fuel is provided at one electrode and a gas containing molecular oxygen such as air or pure oxygen at the other. The electrodes are electrically connected across a load for the development of the electrical energy. In another form, no fuel is used at the electrodes but rather the existence of oxygen at different pressures at the two electrodes permits conversion to electrical energy to by operating the cell in a heat engine. Embodiments are also disclosed for purposes of separating oxygen from a gas mixture and for measuring oxygen pressure.

The invention, both as to its physical arrangement and its manner of operation, together with the above-mentioned and further objects and advantages thereof may best be understood by reference to the following description taken in connection with the accompanying drawings, in which.

Figure 1:
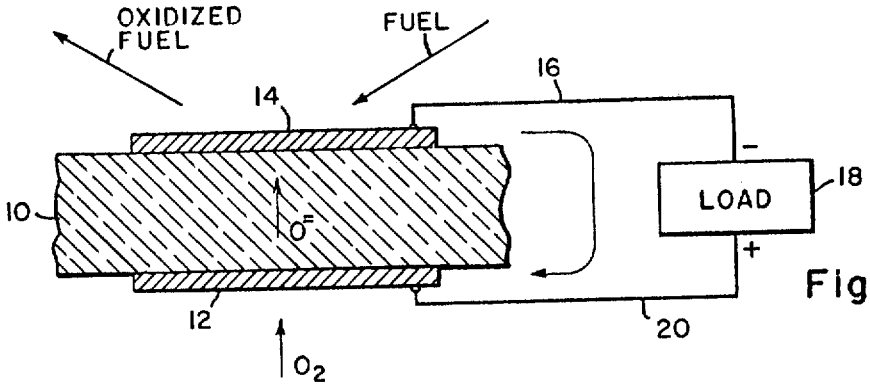
FIG. 1 is a partial cross-sectional view of a fuel cell in accordance with this invention.

Referring now to FIG. 1 there is shown for purposes of explanation a schematic view of a portion of a solid electrolyte fuel cell. The cell consists essentially of a partition comprising a solid electrolyte 10 on one side of which there is a first electrode 12 (cathode) and on the other side is a second electrode 14 (anode). The electrodes 12 and 14 are porous to an extent that gas may readily diffuse through them. To the outer side of the first electrode 12 there is supplied oxygen or an oxygen containing gas such as air and to the outer side of second electrode 14 there is supplied an oxidizable fuel which may be either a solid, such as carbon, or a gas, such as carbon monoxide or hydrogen.

On the first side oxygen is electrochemically reduced at the interface between the electrode 12 and the electrolyte 10 according to the reaction $O_2$+4 electrons $\rightarrow 2O^{=}$, the electrons being supplied by the conductive electrode 12 and the oxygen ions become a part of the electrolyte crystal structure. The ions migrate through the solid electrolyte 10 and at the second electrode 14 they are electrochemically oxidized in the presence of a fuel by a reaction such as $2O^{=}+2H_2 \rightarrow 2H_2O$+4 electrons, where hydrogen is the fuel. Hence, an oxidized fuel is produced which is carried away and electrons are released in the second electrode 14. The electrons flow through an external circuit comprising a lead 16 from the second electrode 14 to a load 18 and then through another lead 20 to the first electrode 12.

The electrochemical reaction of oxygen with a fuel produce a potential difference across external load 18 which maintains a continuous electron and oxygen ion flow in the closed circuit and useful power can be derived.

Among the requirements for the solid electrolyte 10 is that it have a high ratio of ionic conductivity to electronic conductivity. This is necessary so that the potential difference between the electrodes is not reduced by simultaneous diffusion of ions and electrons. Cation conductivity must be very low to prevent destruction of the electrode-electrolyte interface. Furthermore, the electrolyte 10 must act as a barrier to the fuel and to oxygen gas so that direct reaction of the fuel with the oxygen does not occur.

The material making up the solid electrolyte 10 consists essentially of a solid solution of oxides having a high degree of oxygen ion conductivity compared with either electronic conductivity or cation conductivity. The electrolyte can be represented by the general formula:

$$(MO_2)_{1-x}(R_yO_z)_x$$

where M represents at least one tetravalent element from the group consisting of zirconium, thorium and hafnium, R represents at least one element from the group consisting of the elements which form cations with stable +2 and +3 valences in the oxide, x represents a number having a value of from about 0.05 to about 0.3 and y and z represent numbers having values sufficient to make $R_yO_z$ electrically neutral. Examples of elements which are suitable for the element R are calcium, barium, strontium, yttrium, lanthanum, scandium, ytterbium and samarium which form the oxides CaO, BaO, SrO, $Y_2O_3$, $La_2O_3$, $Sc_2O_3$, $Yb_2O_3$ and $Sm_2O_3$, respectively. The first three oxides being of elements of Group II-A and the remaining five oxides being of elements of Group III-B of the Periodic Table as shown on pages 400 and 401 of the Handbook of Chemistry and Physics, 39th edition, and published by Chemical Rubber Publishing Company of Cleveland, Ohio. It should be particularly noted that mixtures of the designated oxides, both those making up $MO_2$ and $R_yO_z$, are suitable such as a mixture of zirconium and thorium oxides for $(MO_2)$ and a mixture of calcium and yttrium oxides for $(R_yO_z)$. The quantity x retains the same range of values.

By a stable valence, it is meant that the element R remains in a single valence state in the oxide over an appreciable range of conditions, particularly in the oxidizing and reducing atmospheres existing at the cathode and anode, respectively, at the temperature of operation.

The optimum value of x, the mole fraction of oxide $R_yO_z$, is that for which cell resistivity is lowest and conduction is by oxygen ions. Present information indicates this optimum value is about 0.13 to about 0.15 for $(ZrO_2)_{1-x}(CaO)_x$.

Conductivity studies to date indicate the optimum value of x varies for different elements R. For example, the work of Strickler and Carlson, reported in part in J. Am. Ceram. Soc., 48, 286 to 289, June 1965, indicates that the maximum conductivity of some binary mixed oxide compositions (wherein element M in the above formula is Zr) occurs near the cubic-monocolinic phase boundary. This indicates the following optimum values of x for some elements R:

| R | $R_yO_z$ | X |
|---|---|---|
| Sc | $Sc_2O_3$ | 0.06 |
| Yb | $Yb_2O_3$ | 0.07 |
| Y | $Y_2O_3$ | 0.09 |
| Sm | $Sm_2O_3$ | 0.10 |

It also appears from present information that conductivity is greater for compositions where the optimum x value is small compared with compositions where the optimum x value is large. For example, $$(ZrO_2)_{.94}(Sc_2O_3)_{.06}$$

is about twice as conductive as $(ZrO_2)_{.91}(Y_2O_3)_{.09}$.

The second oxide ($R_yO_z$) increases the ionic conductivity of the structure and also tends, incidentally, at least where the first oxide is $ZrO_2$, to place the structure in cubic or distorted cubic phase. Thus, such structures are sometimes referred to as stabilized zirconia. The same is believed true of compositions containing hafnia. Thoria is in the cubic form without an additional oxide.

The solid electrolyte 10 preferably has a thickness of about 1.5 mm. or less. It is not desirable for the electrolyte to be thicker because the internal resistance is then increased. The electrolyte should be as thin as it can be fabricated consistent with necessary mechanical strength and ability to permit only oxygen ions to pass through it. To prevent diffusion of molecular gases through the electrolyte, is also necessary that the material be relatively dense or at least have no interconnecting pores.

The electrolyte material is selected for its high ratio of ionic conductivity to electronic conductivity, a high ratio of oxygen ion to cation conductivity and its chemical stability. By cation conductivity is meant the conductivity of the positive ions of the elements M and R in the above formula. It has been found that at relatively high temperatures the above materials have considerably greater ionic than electronic conductivity and the ionic conductivity is relatively high. For example, experiments with $(ZrO_2)_{.85}(CaO)_{.15}$ at 1000° C. have shown that ionic conductivity comprises more than 98% of the total conductivity. The high oxygen ion conduction in structures of this type is believed to result in the following manner, which is presented merely by way of explanation since an understanding of the conduction process is not essential to the practice of the invention. Considering $(ZrO_2)_{1-x}(CaO)_x$ as an example, all of the $Ca^{+2}$ ions entering the lattice replace $Zr^{+4}$ ions in the lattice. An equivalent number of oxygen vacancies are thereby formed in the oxygen lattice in order to preserve electrical neutrality of the crystal. The oxygen vacancies are distributed throughout the lattice and hence provide a path for oxygen ion migration. It has been found suitable to employ an electrolyte having a fluorite-like crystal structure. However, other crystalline structures such as pervoskite and pyrochlorite may be used. Material suitable for use as the solid electrolyte is commercially available and methods of making it are well known. For example, $(ZrO_2)_{1-x}(CaO)_x$, commonly known as calcium stabilized zirconia is widely available in dense forms for the general uses of a ceramic material. The electrolyte should be substantially free of impurities which may increase the electronic and cationic conductivity of it.

The ionic conductivity is found to be temperature dependent and is greater at higher temperatures. Accordingly, it is desirable to operate at high temperatures, particularly about 800° C. and above in the case of fuel cells. At extremely high temperatures certain factors become significant which offset the increase in conductivity. One of these factors is the chemical stability of the electrodes which imposes a practical high temperature limit of about 1200° C.

The selection of suitable electrodes must be done carefully to ensure good low resistance contact to the electrolyte, high temperature chemical stability, sufficient conductivity, porosity and a coefficient of thermal expansion compatible with the solid electrolyte.

Among the electrode materials which have been found suitable are, for the second electrode 14, a mixture of nickel and platinum formed by placing nickel pellets of 50 mesh size wetted with chloroplatinic acid solution in contact with the electrolyte and heating to about 1100 C. For the first electrode 12, an electrode can be used of a mixed meal oxide such as lanthanum nickel oxide ($LaNiO_3$) or calcium lanthanum manganese oxide ($Ca_xLa_yMnO_3$). Such an electrode may be made by spraying with a plasma jet. One or more metals of the platinum group comprising platinum, palladium, rhodium and iridium and their alloys are also suitable for use as either of the electrodes 12 and 14. Methods of forming such a layer of such material suitable for use as an electrode are well known. For example, a paste comprising the powdered metal, such as platinum, in an organic binder can be applied to the electrolyte and heated to remove the binder and fuse the platinum to the electrolyte. It of course simplifies the fabrication procedure if the electrodes 12 and 14 are each of the same material, such as those of the platinum group. Furthermore, such a symmetrical arrangement makes it possible to reverse the fuel and oxygen supply to the electrodes and thus minimize the effect of small cation contributions to the oxygen ion conduction.

The high temperature necessary in order to have good oxygen ion conductivity is ideally maintained as a result of the theoretical heat losses associated with the electrochemical reaction as well as $i^2R$ losses within the cell. Initially of course some other means must be provided to heat the cell to temperature, for example, direct mixing of the oxidant and fuel. In a device of sufficiently large electrode are compactly arranged, heat generated within the system will be sufficiently large to maintain the cell at the operating temperature. The fact that a high operating temperature is required is not necessarily a disadvantage, for example the catalytic problems are minimized. In applications such as torpedoes, for example, batteries may overheat and be damaged due to high current drain. A fuel cell as described here would take advantage of such operating conditions.

Figure 2:
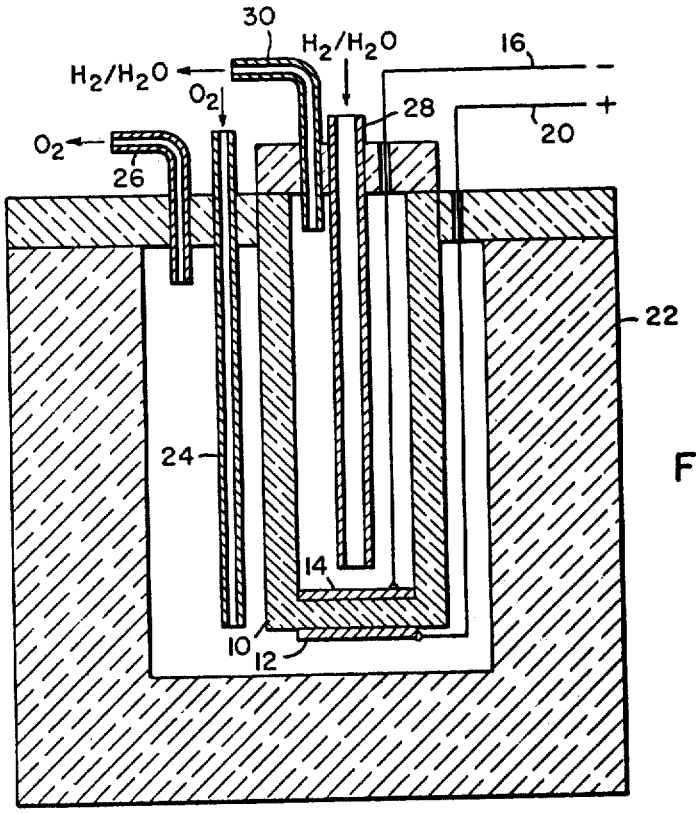
FIG. 2 is a cross-sectional view of a fuel cell made in accordance with this invention.

Referring now to FIG. 2, there is shown a fuel cell in accordance with the present invention. The fuel cell comprises a partition of a solid electrolyte 10 as was above described having first and second electrodes 12 and 14 on opposite sides thereof. This basic structure is contained within a thermally insulated enclosure 22 which is initially heated to the necessary operating temperature by any suitable heat source.

On one side of the solid electrolyte 10 there are provided an inlet means 24 for oxygen or an oxygen containing gas and outlet means 26 for that portion of the oxidant which is not used by the cell. On the other side of the electrolyte 10 there are similarly provided input means 28 for a gaseous fuel and an outlet means 30 for unused fuel and oxidized fuel. Electrical leads 20 and 16 are provided in conductive contact with the first and second electrodes as in FIG. 1.

The device of FIG. 2 is designed for use with a gaseous fuel which may be, for example, a mixture of hydrogen with a small amount of water vapor as well as others previously mentioned.

Figure 3:
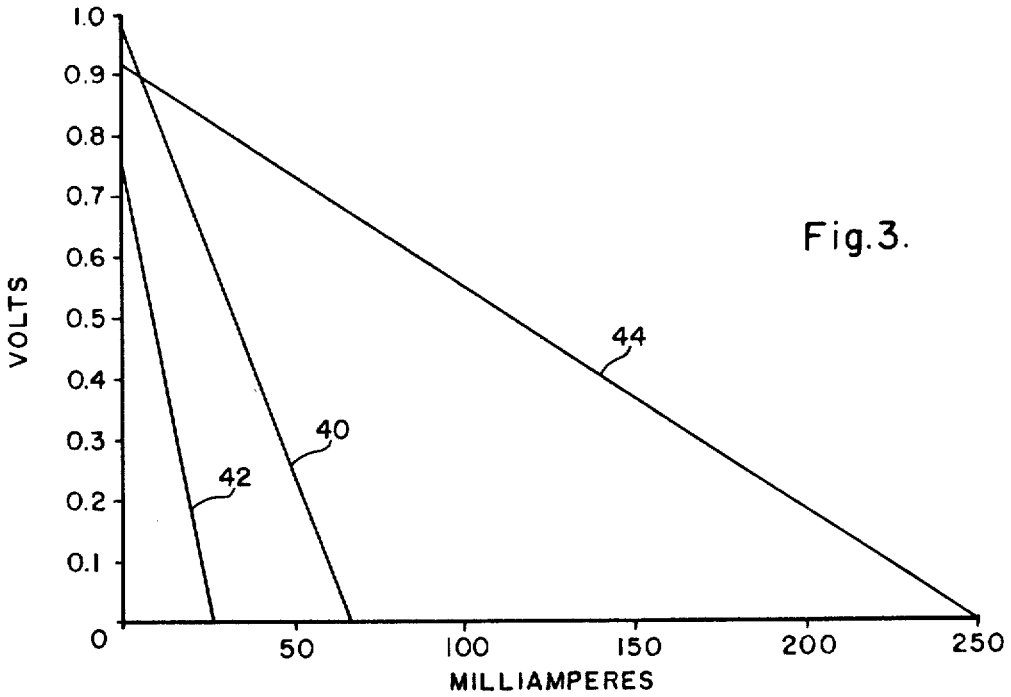
FIG. 3 is a curve of voltage against current for typical fuel cell such as that of FIG. 2.

In FIG. 3 there are shown typical performance curves for a device as shown in FIG. 2. Each curve was obtained with a device using an electrolyte 10 of $$(ZrO_2)_{.9}(CaO)_{.1}$$

The oxidant was pure oxygen.

Curve 40 is derived from a device using an electrode 12 of $LaNiO_3$ on the oxygen side. The electrode 14 on the fuel side was a platinum-nickel mixture. The fuel was $H_2$ and $H_2O$ at a pressure ratio of about 28, the operating temperature was 1074° C., the electrode areas were each 3 square centimeters and the electrolyte thickness was 1.5 mm.

Curve 42 is derived from a device also using an electrode of $LaNiO_3$ on the oxygen side with an effective cell area of 3 square centimeters and an electrolyte 1.5 mm. thick but with an electrode on the fuel side of Pt, a fuel of CO and $CO_2$ at a pressure ratio of the about 1 and an operating temperature of 1197° C.

Curve 44 was derived from a device having electrodes of Pt on both sides, an effective cell area of 2.27 square centimeters, an electrolyte thickness of 0.9 mm., a fuel of $H_2$ and $H_2O$ at a pressure ratio of about 30, i.e. 30 millimeters of hydrogen per millimeter of water vapor, and operating temperature of 1050° C.

The curves 40, 42 and 44 indicate that an electrochemical fuel cell in accordance with the present invention can achieve relatively high current densities.

Cells as described have been operated continuously for periods as long as 625 hours at which time little deterioration was evident. Much longer life is apparently possible. The curves 40, 42 and 44 were taken with experimental devices which due to their small size had to be heated by an independent source but which can be scaled up to adequate size for self-sustained operation.

Figure 4:
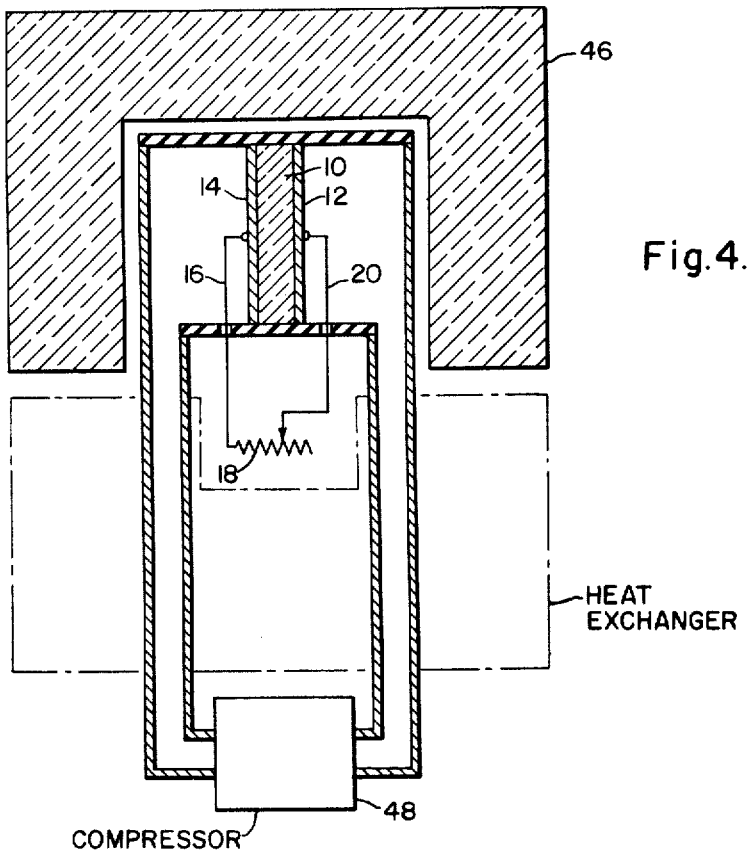
FIG. 4 is a cross-sectional view in schematic form of an electrical energy producing system utilizing an electrochemical cell with oxygen at different pressures on opposite sides of the solid electrolyte.

Other useful electrochemical devices besides fuel cells have been developed using as the solid electrolyte a material as above described. Referring now to FIG. 4 there is shown a schematic of an electrochemical device for the conversion of heat to electrical energy. As contrasted with the device of FIG. 2, the device of FIG. 4 uses no conventional fuel at the electrodes. Instead of operating by reason of oxygen at one side and such a fuel at the other, the device of FIG. 4 operates by reason of there being oxygen on both sides of the solid electrolyte 10 but at different partial pressure so that there will be a potential different at the electrodes. The device of FIG. 4 is shown as a closed system in which oxygen continually circulates.

The solid electrolyte 10 is disposed with first and second electrodes 12 and 14 on either side, each of which has a conductive lead 16 and 20 extending therefrom so that power may be generated across a load 18. The electrolyte 10 and electrodes 12 and 14 are enclosed with a furnace 46 or are in some manner provided so that they are heated to the necessary operating temperature for the device. Some suitable heat source is necessary throughout operation since the oxygen transfer process is endothermic. Besides ordinary heat sources such sources as jet engine exhausts and nuclear reactors can be employed. External to the furnace region and hence at a lower temperature is means 48 for compressing the oxygen gas. Such an oxygen compressor 48 may be for example any of the well known mechanical devices for compressing gases. Oxygen passing through the compressor 48 is compressed to the higher pressure existing on the side of the solid electrolyte 10 having the first electrode 12. As a result of the higher pressure there existing a potential difference is developed between the electrodes which causes electrons released at the anode 14 to pass through the external electrical circuit back to the cathode 12. At the same time a current of oxygen ions passes through the electrolyte to the second electrode 14, or from right to left in the drawing, with electrons being released at the anode resulting in the oxidation of oxygen ions and the release of oxygen gas which recirculates through the compressor.

The pertinent reaction at the cathode 12 is therefore, $O_2$+4 electrons → 20=and at the anode 14 it is 20= → $O_2$+4 electrons.

It is of course desirable that the device of FIG. 4 be operable with a net output power, that is, the oxygen compressor 48 must be such as to consume less power than that produced by the electrochemical cell.

Another means for maintaining an oxygen pressure difference at the two electrodes 12 and 14 of the cell is by the use of a metal or metal oxide or possibly a molecular sieve type material capable of reacting with oxygen formed at the low pressure chamber and then being decomposed at a higher temperature to build up the oxygen pressure at the cathode 12.

Figure 5:
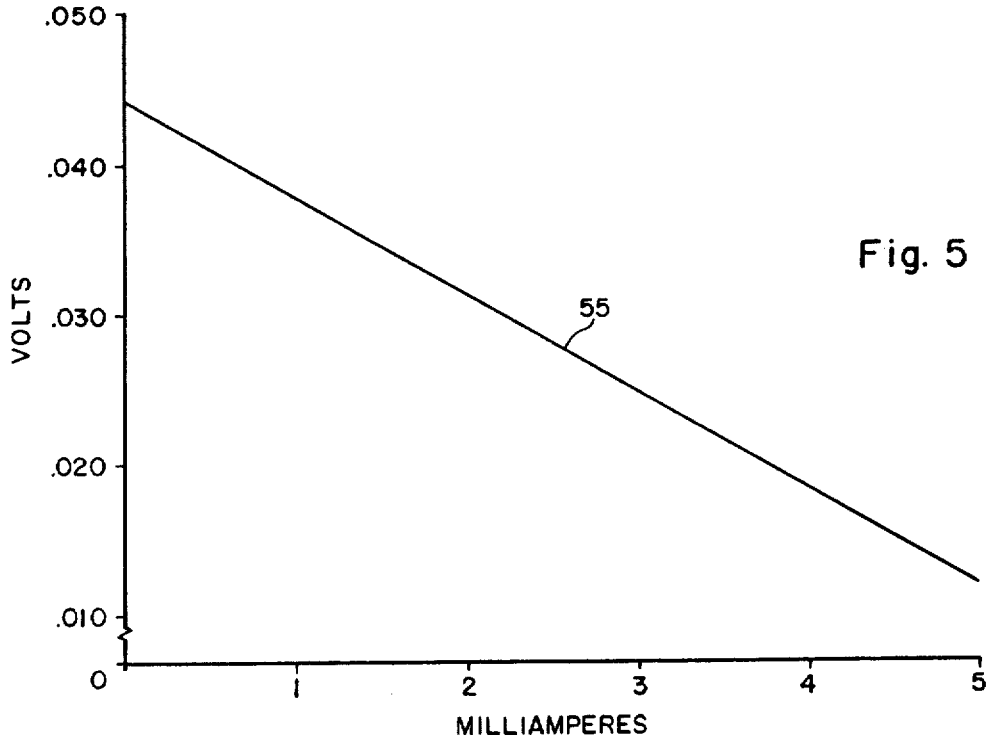
FIG. 5 is a curve of voltage against current for a typical cell in a system like that of FIG. 4.

A performance curve 55 obtained for the electrochemical cell portion of a heat engine device similar to that shown in FIG. 4 is shown in FIG. 5. Curve 55 was obtained by maintaining an oxygen partial pressure of 726.2 torr at the cathode and 152.5 torr pressure at the anode and operating at a temperature of about 1024° C. The cell electrolyte had the composition $(Z_rO_2)_{.85}$-$(CaO)_{.15}$ and the electrodes on each side were of platinum. The experimental open circuit voltage agrees closely with the theoretical EMF of an oxygen concentration cell as calculated from the theoretical relation EMF=$4.96\times10^{-5}$ $$T \log \frac{cP_{02}}{aP_{02}}$$

where T is the temperature in °K, $cP_{02}$ is the pressure at the cathode and $aP_{02}$ is the pressure at the anode.

Figure 6:
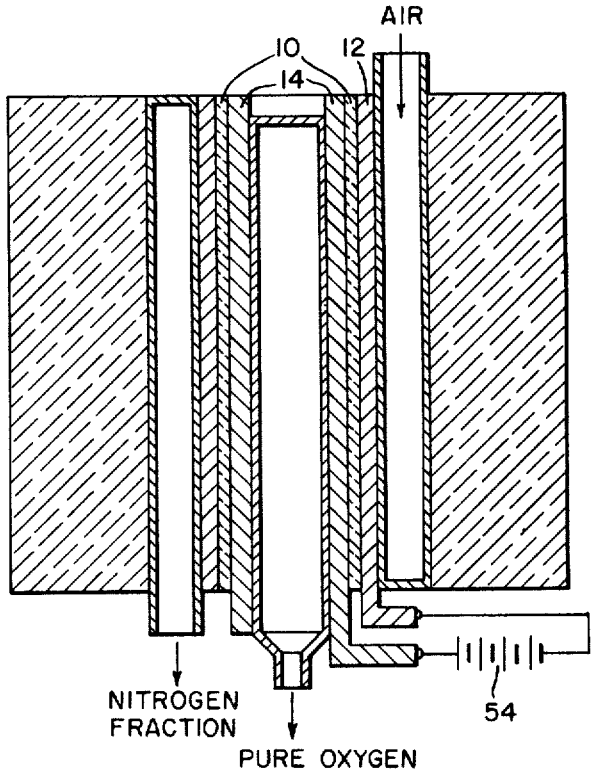
FIG. 6 is a cross-sectional view of an electro-chemical cell utilized as a device for separating oxygen from a gas mixture.

In FIG. 6 is shown another device using the solid electrolyte and porous electrode structure as previously described but in a cylindrical configuration which may also be used in the previously described devices.

Here, however, this structure is utilized as an electrolytic oxygen concentration cell for the purpose of separating oxygen from a mixture of gases such as air rather than using the cell as a galvanic device as in the previous embodiments. For the operation of the device, it is necessary that a DC power source 54 be provided when the oxygen partial pressure on opposite sides of the electrolyte is the same or if the oxygen is at a higher partial pressure at the pure oxygen electrode 14. Even with a higher oxygen partial pressure at the impure oxygen electrode 12 a power supply 54 is desirable in order to transfer oxygen through the cell more rapidly. The nature of the electrolyte 10 is such that gases other than oxygen cannot be transferred electrolytically through it. As a result, the gas obtained at the second electrode 14 is substantially pure oxygen while that discharge from the first electrode 12 is a nitrogen rich fraction of air.

This device is useful in any application where it is desirable to separate oxygen and provides an alternative for low temperature fractionation processes. It may also be used for pressurizing oxygen. It may be operated with a device as shown in FIG. 4 used as the power source 54. Configurations are also obvious wherein a device like that of FIG. 6 is used to pump oxygen from a lower to a higher pressure for the operation of the device of FIG. 4, so long as the compressor cell operates at a lower temperature.

Figure 7:
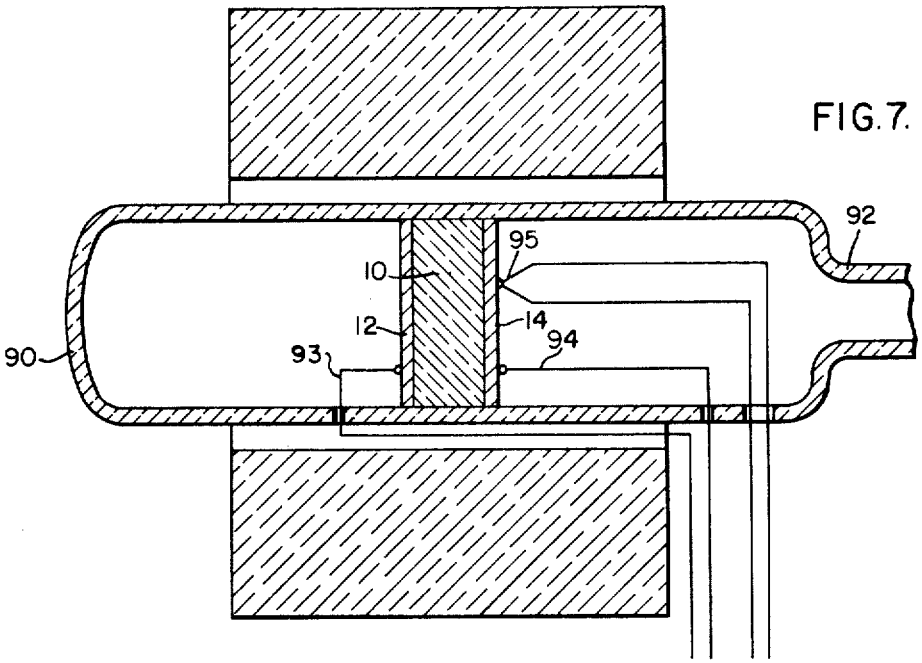
FIG. 7 is a cross-sectional view of an electro-chemical cell utilized as a device for measuring oxygen pressure.

Another useful device utilizing the structure of the solid electrolyte 10 and porous electrodes 12 and 14 is that of FIG. 7 which is a device for the measurement of oxygen pressure. Here the oxygen on the cathode side 12 is maintained at a known pressure within the sealed portion 90. The pressure of the oxygen on the other side is to be measured and is provided with a tubulation 92 to communicate with an oxygen gas containing system. The pressure is measured by measuring the potential difference between the electrodes 12 and 14 by leads 93 and 94. That is, the device of FIG. 7 operates substantially as that of the electrochemical cell portion of FIG. 4, however, rather than drawing current for the purpose of power generation in FIG. 7 the EMF is measured as a measure of oxygen pressure since there is a direct relation between the EMF established between the electrodes and the oxygen pressure at the electrodes 12 and 14. Since the EMF also varies with temperature, it is desirable to use a temperature indicator such as a thermocouple 95 at the cell. It should be noted that the oxygen at unknown pressure existing on the anode side is assumed lower than that on the cathode, otherwise the polarity of the EMF is reversed. Also, the oxygen on either side may exist in a gas mxiture without operation being substantially affected since mixture the oxygen partial pressure ratio determines the EMF established between the electrodes.

Figure 8:
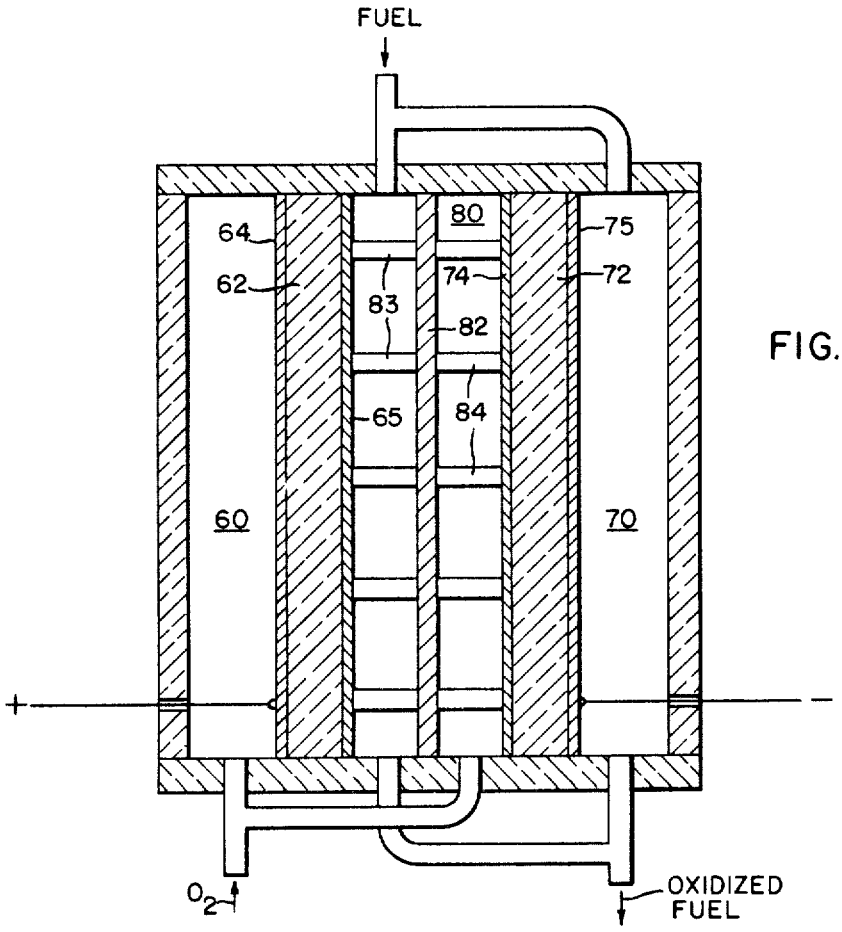
FIG. 8 is a cross-sectional view of a plurality of electrochemical cells joined in a unitary structure from which a single output may be obtained.

In order to generate useful amounts of power with devices as described herein the useful electrode area must be fairly large. It is then desirable to form efficient and compact structures for combining a plurality of individual cells in a unit providing a single electrical output. Such a device is shown in FIG. 8 where each of the individual cells 60 and 70 comprises a solid electrolyte partition 62 and 72 with electrodes 64 and 65 and 74 and 75 on their opposite sides. Between the cells 60 and 70 there is provided a conductive member 80 comprising a solid plate 82 non-porous to gases to prevent mixing of fuel and oxidant with projections 83 and 84 on opposite sides in contact with the electrodes 65 and 74, respectively. The member 80 is electronically conductive. The projections 83 and 84 extend through gas channels for supplying the fuel gas and the oxidant to the respective electrodes and are not so large as to impair gas flow. It is of course obvious that such a configuration is useful with any solid electrolyte fuel cell design and is not necessarily limited to that disclosed herein. Also, additional fuel cells may be incorporated in the structure, each separated by an electronically conductive member 80.

In this way the thermal losses due to leads extending from the heated device is reduced since only one pair of external leads is necessary. Also, electrical loss ($i^2R$) in the leads are reduced since a plurality of contacts is provided in parallel between adjacent cells.

While the present invention has been shown and described in certain forms only, it will be obvious to those skilled in the art that it is not so limited but is susceptible of various changes and modifications without departing from the spirit and scope thereof.

What is claimed is:

1. A fuel cell comprising: a solid partition of a solid electrolyte consisting essentially of a solid solution of oxides having a high degree of oxygen ion conductivity compared with either electronic conductivity or cation conductivity, said solid electrolyte having the formula $$(MO_2)_{1-x}(R_yO_z)_x$$

where M represents at least one tetravalent element forming an oxide highly stable at temperatures of about 500°C to about 1200°C selected from the group consisting of zirconium, thorium and hafnium, R represents at least one element from the group consisting of elements of Groups II-A and III-B of the Periodic Table which form cations with stable +2 and +3 valences in the oxide, x represents a number having a value from about 0.05 to about 0.3 and y and z represent numbers having values necessary to make ($R_yO_z$) electrically neutral; a first porous electrode consisting of lanthanum nickel oxide applied to a first face of said partition; a second porous electrode consisting of a mixture of nickel and platinum applied to the opposite face of said partition; said electrodes being stable at temperatures of about 500°C to about 1200°C; [mean] *means* for supplying gas containing oxygen to said first electrode; means for supplying a fuel capable of reacting with oxygen on the opposite side of said partition near to said second electrode; means for heating said electrodes to an elevated temperature of about 500°C to 1200°C whereby oxygen forms ions at said first electrode which migrate through said partition upon placing it in a closed circuit and react with said fuel at the second electrode, said electrodes thereby developing a potential difference; and means for withdrawing the reaction products from near said second electrode.

2. A fuel cell as in claim 1 wherein: R represents at least one element from the group consisting of calcium, barium, strontium, yttrium and lanthanum.

3. A fuel cell as in claim 1 wherein: said solid electrolyte has the formula $(ZrO_2)_{1-x}(CaO)_x$ where x represents a number having a value from about 0.1 to about 0.3.

4. A method for separating oxygen from a gas containing oxygen or for producing substantially pure oxygen comprising: supplying a gas containing oxygen to a first electrically conductive porous electrode of an electrochemical cell comprising a solid electrolyte consisting essentially of a solid solution of oxides having a high degree of oxygen ion conductivity compared with either electronic conductivity or cation conductivity, said solid electrolyte having the formula $(MO_2)_{1-x}(R_yO_z)_x$ where M represents at least one tetravalent element from the group consisting of zirconium, thorium, valent element from the group consisting of zirconium, thorium, and hafnium, R represents at least one element from the group consisting of elements of Groups II-A and III-B of the Periodic Table which form cations with stable +2 and +3 valences in the oxide, x represents a number having a value of from about [0.05] *0.1* to about 0.3 and y and z represent numbers having values sufficient to make $R_yO_z$ electrically neutral; said first electrically conductive porous electrode and a second electrically conductive porous electrode being disposed on opposite surfaces of said solid electrolyte; heating said electrolyte and electrodes, while supplying said gas, to a temperature within the range of from about 500°C to 1200°C; applying, while supplying said gas and heating said electrolyte and electrodes, a DC potential difference across said electrodes of a polarity such that said first electrode is negative with respect to said second electrode so that substantially pure oxygen is produced at said second electrode.

5. A method as in claim 4 wherein: said gas containing oxygen contains said oxygen in molecular form.

[6. A method as in claim 4 wherein: x represents a number having a value from about 0.1 to about 0.3.]

7. A method as in claim [6] *4* wherein R represents at least one element from the group consisting of calcium, barium, strontium, yttrium and lanthanum; and said gas containing oxygen contains said oxygen in molecular form.

8. A method for generating electrical energy comprising: establishing unequal oxygen partial pressures at first and second electrically conductive porous electrodes of an electrochemical cell comprising said electrodes on opposite surfaces of a solid electrolyte consisting essentially of a solid solution of oxides having a high degree of oxygen ion conductivity compared with either electronic conductivity or cation conductivity; said solid electrolyte having the formula $(MO_2)_{1-x}(R_yO_z)_x$ where M represents at least one tetravalent element from the group consisting of zirconium, thorium and hafnium, R represents at least one element from the group consisting of elements of Groups II-A and III-B of the Periodic Table which form cations with stable +2 and +3 valences in the oxide, x represents a number having a value of from about [0.05] *0.1* to about 0.3 and y and z represent numbers having values sufficient to make $R_yO_z$ electrically neutral; said electrodes being electrically connected across a load in an external circuit; excluding oxidizable fuel from said electrodes to develop electrical power across said load by reason of said unequal oxygen partial pressures at said electrodes.

[9. A method as in claim 8 wherein: x represents a number having a value of from about 0.1 to about 0.3.]

10. A method as in claim [9] *8* wherein: R represents at least one element from the group consisting of calcium, barium, strontium, yttrium and lanthanum.

11. A method as in claim [9] *8* wherein: the establishing of unequal oxygen partial pressures and the excluding of oxidizable fuel are effected by providing an enclosure completely enclosing said electrolyte and said electrodes with said enclosure containing oxygen gas and a compressor means disposed therein to maintain said partial pressures unequal.

[12. A method for the measurement of oxygen pressure comprising: establishing and maintaining an oxygen partial pressure of known value at a first electrically conductive porous electrode of an electrochemical cell including a solid electrolyte consisting essentially of a solid solution of oxides having a high degree of oxygen ion conductivity compared with either electronic conductivity or cation conductivity, said solid electrolyte has the formula $(MO_2)_{1-x}(R_yO_z)_x$ where M represents at least one tetravalent element from the group consisting of zirconium, thorium, and hafnium, R represents at least one element from the group consisting of elements of Groups II-A and III-B of the Periodic Table which form cations with stable +2 and +3 valences in the oxide, x represents a number having a value of from about 0.05 to about 0.3 and y and z represent numbers having values sufficient to make $R_yO_z$ electricallly neutral, said first electrically conductive porous electrode and a second electrically conductive porous electrode being disposed on opposite surfaces of said solid electrolyte; supplying a gas containing an unknown oxygen partial pressure to said second electrode; measuring an electrical output across said electrodes as a measure of said unknown oxygen partial pressure.]

13. A method [ as in claim 12 wherein:] *for the measurement of oxygen pressure comprising: establishing and maintaining an oxygen partial pressure of known value at a first electrically conductive porous electrode of an electrochemical cell including a solid electrolyte consisting essentially of a solid solution of oxides having a high degree of oxygen ion conductivity compared with either electronic conductivity or cation conductivity, said solid electrolyte has the formula* $(MO_2)_{1-x}(R_yO_z)_x$ *where M represents at least one tetravalent element from the group consisting of zirconium, thorium and hafnium, R represents at least one element from the group consisting of elements of Groups II-A and III-B of the Periodic Table which form cations with +2 and +3 valences in the oxide,* x represents a number having a value of from about 0.1 to about 0.3 *and y and z represent numbers having values sufficient to make* $R_yO_z$ *electrically neutral, said first electrically conductive porous electrode and a second electrically porous electrode being disposed on opposite surfaces of said solid electrolyte; supplying a gas containing an unknown oxygen partial pressure to said second electrode; measuring an electrical output across said electrodes as a measure of said unknown oxygen partial pressure.*

14. A method as in claim 13 wherein: R represents at least one element of the group consisting of calcium, barium, strontium, yttrium and lanthanum; and further comprising measuring the cell temperature, while measuring said electrical output, so that electrical output variations due to temperature varitions can be accounted for.

* * * * *